May 13, 1958  MAKIO MURAYAMA  2,834,654
METHOD AND APPARATUS FOR AUTOMATIC AMPEROMETRIC TITRATION
Filed Feb. 1, 1954
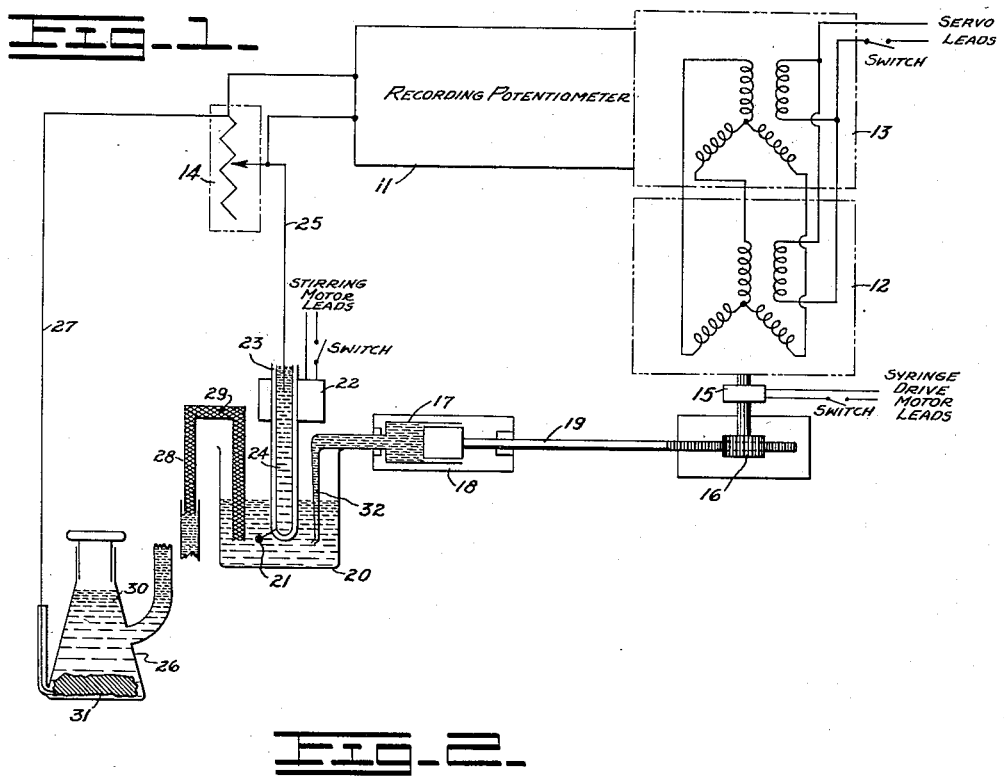
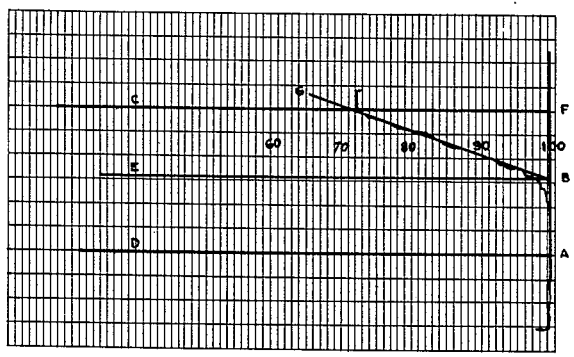
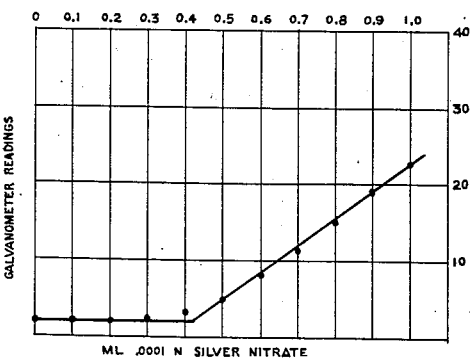
INVENTOR
MAKIO MURAYAMA
BY
ATTORNEYS

United States Patent Office 2,834,654
Patented May 13, 1958

2,834,654

METHOD AND APPARATUS FOR AUTOMATIC AMPEROMETRIC TITRATION

Makio Murayama, Dearborn, Mich.

Application February 1, 1954, Serial No. 407,500

3 Claims. (Cl. 23—230)

The present invention relates to a titration method and apparatus and more particularly to an automatic amperometric titration apparatus wherein the measurement of diffusion current of the substance being titrated, or that of the re-agent, is automatically recorded in the form of a characteristic amperometric titrating curve.

It is desirable in laboratory work to provide instruments which will eliminate as many human factors as possible in gathering quantitative measurements. Prior methods required the tedious plotting for results using either a colorometric or an electrometric technique for gathering point-by-point data. While the materials to be titrated determined the selection of the titration method, prior techniques required the tedious plotting of the titration curve using data collected colorometrically or electrometrically and a point-by-point correlation of the data to yield characteristic curves. In the apparatus of Lingane (U. S. Letters Patent 2,650,256) an automatic titration apparatus was shown wherein switching devices accomplished a diminishing incremental metering of the titrant as the end point is approached in potentiometric titration. In the present invention, adjustment for incremental flow is unnecessary and amperometric titration curves are simply obtained. The device of Lingane is not adaptable to amperometric titrations since amperometric titration requires constant movement through the end point. In certain research fields, particularly dealing in serums, proteins, and sulfhydryl groups, for example, potentiometric titration is presently not useful since such materials are not amenable to potentiometric titration. Such materials are amenable to amperometric titration and the present invention renders procedures automatic which were hitherto tedious and time consuming.

Accordingly, it is one of the objects of this invention to provide an apparatus that will record amperometric titration curves quickly and with ease and accuracy.

Another object is to describe a method, adaptable to a wide range of amperometric titrations, capable of producing accuracy and precision equal to that obtained by manual methods of amperometric titrating and plotting.

It is another object of this invention to provide amperometric curves which are more simply reproducible than by manual means.

The simplicity of the apparatus is an overall objective and will be readily appreciated along with other advantages as the description proceeds.

In the drawings:

Figure 1 is a schematic drawing showing the apparatus required for the automatic recording of amperometric titration curves and indicates the receiver-transmitter servo electric liaison between syringe driven burette and chart drive.

Figure 2 is an illustration of an automatically plotted titration curve using the method and apparatus herein described.

Figure 3 is a graph representing a hand plotted titration curve.

Referring more particularly to the drawing the main component of the apparatus for automatically recording an amperometric titration curve is a high speed recording potentiometer 11. The recording potentiometer 11 selected, and schematically represented, is of the type having a two second full pointer travel, such as is commercially available in the Brown Electronik function plotter and which is equipped with a pair of General Electric Selsyn units 12 and 13. Comparable equipment from other manufacturers is also satisfactory but the equipment indicated has been used in the apparatus and is known to be readily available. The diffusion current of the titrated material is recorded upon the potentiometer 11 in terms of the IR drop across a variable resistor 14. Faster pointer travel in the potentiometer 11 is desirable, but the two second travel has proved entirely satisfactory. The resistor 14 is a standard variable resistor so that any desired current sensitivity may be established. The pair of Selsyn units 12 and 13 running synchronously by means of a Selsyn circuit linkage, as indicated in Fig. 1, rotates the recording drum of the potentiometer 11 and mechanically coordinates the actuation of a titrant carrying syringe burette 17. A Selsyn generator or transmitter 12 is mechanically linked to the syringe burette drive motor 15 and is electrically linked to the motor receiver 13 which energizes the chart drive so that the resultant chart movement represents the function of volume titrant against a current response. The Selsyn system is in effect a servo-transmitter and receiver permitting absolute simultaneous reproducing of the movement of the burette drive motor 15. The mechanical actuation of the syringe 17 is accomplished by gearing 16 driven by the motor 15. While the motor 15 selected was a synchronous type it will be understood that other type motors can be adaptable if mechanically linked to the transmitter or generator 12. The gearing 16 in a specific application later to be the subject of example was such as to advance .180 inch per minute. Other gear ratios may be selected as desired. When a ten milliliter syringe 17 is used approximately one milliliter of titrant is ejected from the syringe 17 in two minutes and the corresponding chart speed is one inch per minute. A carriage 18 is arranged to hold the syringe 17 and accommodate the gear driven piston 19. The syringe burette 17 is extended into the titrating vessel 20. A platinum wire electrode 21 is extended into the titrating vessel 20 and is arranged to be chucked and rotated by a stirring motor 22. The wire electrode 21, preferably platinum, becomes the stirrer since it extends outwardly into the titrating vessel 20 from its tube sheath 23. The tube sheath 23 carries mercury 24 and a wire connection is accomplished by mercury immersion at the top of the tube 23. The wire lead 25 runs from the electrode and connects to the potentiometer 11 through said variable resistor 14.

A reference cell 26 is mercury connected to the potentiometer circuit through wire lead 27 and is bridged into the titrating vessel 20 by an agar-potassium chloride filled U-tube 28. It will be understood that other salt bridges can be utilized. The bridge 29 found most satisfactory was prepared by warming three grams of powdered agar-agar in 100 milliliters of ether saturated potassium chloride or 13 percent potassium nitrate solution and gelled when suitably homogenous in the tube 28. The reference cells 26 actually used in the supporting example of actual titration had a potential of —0.23 volt. The voltage of the reference cell 26 will be understood as capable of variations in accord with the characteristics of the titrated substance. The electrolyte 30 was prepared by dissolving 4.2 grams of potassium iodide and 1.3 grams of mercuric iodide in 100 milliliters of saturated potassium chloride solution. The layer of mercury 31 serves as the electrode.

The apparatus necessary to accomplish automatic amperometric titrations having been described it remains to place the apparatus in its operative setting. The utility of this apparatus is demonstrated by showing titration of compounds containing sulfhydryl (mercapto) groups which which occupy a unique position in metabolic and chemical studies because of their intimate association with the problems of enzyme function, protein structure, cellular proliferation and the like. It will be understood, however, that the apparatus described has other titration application where the titrated material responds favorably to amperometric titration.

It is necessary to standardize the apparatus daily and a standard solution of n-dodecyl mercaptan is prepared by dissolving 75 milligrams of the n-dodecyl mercaptan in ten milliliters of absolute ethanol. One milliliter of the stock solution thus prepared is diluted to 25 milliliters with absolute ethanol for use as a working standard. Such a solution contains .0015 micromole of sulfhydryl per milliliter and will require less than two milliliters of .001 Normal silver nitrate for standardization.

The titrant 32, as indicated, is a solution of .001 Normal silver nitrate prepared from crystals of reagent grade and standardized against recrystallized sodium chloride.

A supporting electrolyte is prepared by adding 30 grams of ammonium nitrate to 125 milliliters of concentrated ammonium hydroxide and 100 milliliters of distilled water.

One milliliter of the working standard is pipetted into the titrating vessel 20 containing 29.0 milliliters of absolute ethanol and one milliliter of supporting electrolyte. The agar-potassium chloride bridge 29 is placed in position and electrolytic connection made. The stirring motor 22 is started and correspondingly the chart drive motor or receiver 13. In a few minutes the recording potentiometer 11 measuring diffusion current in terms of IR drop ceases to "wander" or "float" and comes to a stable value asymptotically. The synchronous syringe burette drive motor 15 is started and 0.5 milliliter of .001 Normal silver nitrate is delivered per minute. A pencil mark may be placed upon the chart at the start of the titration corresponding with the starting point of the titration and located conveniently on one side of the horizontal chart lines as point A in Fig. 2. At first an aimless wandering of the stylus may occur which indicates poor electrode response. If two or three "blank" titrations are attempted the apparatus stabilizes to produce a typical titration curve such as illustrated in Fig. 2.

Serum and serum fractions are titrated in the dilute methanol-supporting electrolyte in the same manner as the standard. One milliliter of serum or serum fraction is added to 30 milliliters of diulte methanol-supporting electrolyte and the titration with the .001 Normal silver nitrate is carried out as above indicated. After each titration the electrode and salt bridge are rinsed with distilled water and blotted dry with filter paper or surgical sponges.

The curves thus obtained repreesnt a plot of current versus volume of titrant, automatically obtained. When the curves are obtained it is only necessary to draw two straight lines and their intersection establishes the end point as in Fig. 2. The end point is indicated in Fig. 2 by the intersection of lines AB and BG, intersecting at B, the end point. The end point may then be simply calculated in the following manner:

*Calculation by proportion*

With reference to the typical automatically obtained plot in Fig. 2, since AF represents 1.0 milliliter of the titrant and AB is X the unknown, then $AB:AF$ as $X:1.0$. But AF, the extension of AB is represented by six divisions of the strip chart or 50 millimeters and AB by 3.1 divisions. Therefore:

$$X = 1.0 \times \frac{3.1}{6.0} = 0.52$$

This means that for 100 milliliters of serum protein —SH groups, the end point becomes $0.52 \times 100$ or 52 micromoles of —SH per 100 milliliters.

*Calculation by proportional line segments*

A metric scale rule is utilized. The "zero" of the rule is placed at point A. The rule is adjusted so that the mark "10" coincides with the mark C on the line CF. The line BE will cut the rule and the end point may be read directly off the rule. The same result is obtained as above for 100 milliliters of serum protein —SH or 52 micromoles (see Fig. 2).

For comparative purposes, Fig. 3 in the drawing represents a random selected amperometeric titration curve plotted point-by-point with volume against galvanometric readings where the end point is 42 micromoles per 100 milliliters of serum. Comparative quality of results were obtained in a fraction of the time required to make a point-by-point plot. When the curve reproduced in Fig. 2 is prepared, utilizing the described equipment and procedure, the economy of time in some instances also avoided to a considerable extent difficulties frequently encountered in the point-by-point method because of contamination or reactions of a secondary nature within the titrating vessel which caused inconsistent curves in the slower point-by-point method.

While a Selsyn servo-linkage makes possible the function plotting of volume of titrant against ampere response because of the faithful reproduction of burette drive in the chart drive of the potentiometer, it will be understood that mechanical liaison would be the full equivalent of the servo system and such is intended to fall within the scope of the appended claims.

Having thus described my invention, I claim:

1. In an automatic titration apparatus, the combination including: a reference cell; a titrating vessel; a rotating stirring electrode in said vessel; a bridge between said vessel and said reference cell; leads from said reference cell and said stirring electrode through a variable resistor; a recording potentiometer including a chart drive motor having at least two second full scale pointer travel connected to said leads; a motor driven syringe burette extending into said titrating vessel; and, means synchronizing uninterruptedly the movement of said syringe burette with the chart drive of said recording potentiometer.

2. An automatic amperometric titration recording apparatus including: a recording potentiometer having at least a two second full scale pointer travel; a titrating vessel; a reference cell to one side of said potentiometer and bridged into said titrating vessel; a rotating electrode extending into said vessel and having leads therefrom through a variable resistor and to the said recording potentiometer; a motor driven syringe burette for uninterruptedly delivering titrant to said vessel; and a servo circuit synchronizing the movement of said motor driven syringe burette.

3. In a method for automatic amperometric titration, the steps which include: uninterruptedly inserting material to be titrated into a titrating vessel while constantly agitating said titrating material; continually uninterruptedly and graphically measuring the amperometric characteristics of the said material to be titrated; adding a titrant to said material to be titrated at a constant rate while synchronizing the automatic amperometric measurements with the addition of titrant.

References Cited in the file of this patent

UNITED STATES PATENTS

| | | |
|---|---|---|
| 1,450,023 | Edelman | Mar. 27, 1923 |
| 1,530,833 | Keeler | Mar. 24, 1925 |
| 1,684,645 | Smith | Sept. 18, 1928 |
| 2,047,727 | Dueringer | July 14, 1936 |
| 2,650,256 | Lingane | Aug. 25, 1953 |
| 2,666,691 | Robinson | Jan. 19, 1954 |
| 2,672,405 | Sheen | Mar. 16, 1954 |

OTHER REFERENCES

Kolthoff: "Amperometric Titrations" Analytica Chemica ACTA, vol. 2 (1948), pages 606–619.